US005999700A

United States Patent [19]

Geers

[11] Patent Number: 5,999,700

[45] Date of Patent: Dec. 7, 1999

[54] PORTABLE REFRIGERANT SUPPLY TANK HEATING UNIT

[76] Inventor: Kevin Geers, 814 Weathervane, Ballwin, Mo. 63021

[21] Appl. No.: 09/046,452

[22] Filed: Mar. 23, 1998

[51] Int. Cl.[6] .................................................... A47J 27/00

[52] U.S. Cl. .......................... 392/441; 392/444; 219/386

[58] Field of Search .................................... 392/441, 444, 392/449, 451; 62/292; 219/386, 441

[56] References Cited

U.S. PATENT DOCUMENTS

| | | | |
|---|---|---|---|
| 2,849,588 | 8/1958 | Marcuse | 219/38 |
| 2,859,326 | 11/1958 | Fisher, Jr. | 219/38 |
| 4,761,961 | 8/1988 | Marx | 62/50.2 |
| 4,833,299 | 5/1989 | Estes | 392/444 |
| 5,167,126 | 12/1992 | Cartwright . | |
| 5,265,440 | 11/1993 | Baker | 62/371 |
| 5,339,646 | 8/1994 | Verlinden et al. | 62/292 |
| 5,375,425 | 12/1994 | Cobb | 62/77 |
| 5,377,495 | 1/1995 | Daigle . | |
| 5,557,940 | 9/1996 | Hendricks . | |
| 5,827,050 | 10/1998 | Price | 417/207 |

*Primary Examiner*—Teresa Walberg
*Assistant Examiner*—Thor S. Campbell
*Attorney, Agent, or Firm*—Polster, Lieder, Woodruff & Lucchesi

[57] ABSTRACT

A portable heating unit for heating a refrigerant supply tank is provided to facilitate the recharging of refrigeration units, such as air conditioning unit, refrigerators, etc. The heating unit includes a housing defining an enclosure sized to receive at least a portion of the supply tank and is adapted to be filled with water. An electrical heating element is used to heat the water. A temperature control switch is provided to cut power to the heating element when the water temperature exceeds a predetermined amount. A pressure switch is also provided to cut power to the heating element when the pressure within the supply tank exceeds a predetermined amount. The pressure switch also operates a solenoid activated outlet valve, and activates the solenoid when the supply tank pressure exceeds the predetermined pressure to evacuate the water from the housing. Lastly, the unit includes an operational pressure switch which is responsive to the pressure in a hose connected to the supply tank valve. The operational pressure switch closes the circuit containing the heating element only when the supply hose is pressurized (i.e., when it is connected to the target unit and when the tank valve is opened).

12 Claims, 2 Drawing Sheets

PORTABLE REFRIGERANT SUPPLY TANK HEATING UNIT

CROSS-REFERENCE TO RELATED APPLICATIONS

Not applicable

STATEMENT REGARDING FEDERALLY SPONSORED RESEARCH OR DEVELOPMENT

Not Applicable.

BACKGROUND OF THE INVENTION

This invention relates to refrigerant supply tank heating units for recharging refrigeration units, and in particular, to a portable on-site heating unit.

For various reasons, refrigeration units, such as air-conditioning units, refrigerators, etc., loose their refrigerant and must be recharged. Typically, the system being serviced is recharged simply by connecting it to a supply tank by means of a hose. Typically, the supply tank is a 30–50 lb. tank. The recharging process relies on the pressure differential between the refrigeration supply tank and the refrigeration system, and the refrigerant flows from the pressurized supply tank to the refrigeration unit which has a lower pressure than the supply tank. As long as the pressure in the supply tank is greater than the pressure in the refrigeration unit, refrigerant will flow unaided from the supply tank to the refrigeration unit.

As the target unit is filled, the supply tank empties, and the pressure differential between the two becomes smaller. As the pressure differential becomes smaller, the flow of refrigerant from the supply tank to the target unit slows, increasing the time it takes to fully fill the target unit. This problem is enhanced in cold weather, when the refrigerant supply tank is cold, and hence the refrigerant is at a lower pressure than on a warm day.

Service technicians have resorted to heating the supply tank to increase the pressure of the refrigerant in the supply tank. This overcomes the problem caused by the reduced pressure in the tank. However, I know of no unit which is not complex, simple in construction, light in weight, easy to use, and easy to transport from one location to another. U.S. Pat. No. 5,557,940 to Hendricks discloses a refrigerant heating unit. However, the Hendricks heating unit relies on a blower and heater to heat the refrigerant. The blower is heavy, making the unit difficult to transport to roof-tops to service roof-top air-conditioners.

BRIEF SUMMARY OF THE INVENTION

The following objects are present in one or more of the claims of the invention.

An object of the present invention is to provide a refrigerant heating unit.

Another object is to provide such a unit which is light in weight, and thus easy to transport between locations.

Another object is to provide such a unit which includes safety controls to substantially reduce overheating (and over-pressurization) of the refrigerant supply tank.

These and other objects will become apparent to those skilled in the art in light of the following disclosure and accompanying drawings.

Briefly stated, a portable heating unit for heating a refrigerant supply tank used in recharging refrigeration units is provided. The heating unit comprises a housing having a bottom and side walls which define an enclosure sized to receive at least a portion of the supply tank and which is adapted to contain water to at least partially immerse the supply tank in water. A heating element is positioned in the enclosure to heat the water which surrounds the supply tank to increase the pressure in the supply tank when necessary.

The heating unit is provided with a power cord to connect the unit to a supply of electricity. The free end of the power cord is provided with connectors, such as alligator clips, to connect the power cord to the external disconnect box of a building being serviced. This provides access to the building's 240 V power supply.

A temperature control switch responsive to the temperature of the water in the enclosure is placed in series with the heating element. The temperature control is operable to open the electrical circuit containing the heating element when the temperature of the water exceeds a determined amount. A pressure control switch is also provided. The pressure control switch is responsive to the pressure within the supply tank and is also placed in series with the heating element. The pressure control switch is operable to open the electrical circuit containing the heating element when the pressure in the supply tank exceeds a determined amount.

An outlet valve is provided to evacuate the water in the housing when the supply tank pressure exceeds the predetermined amount. The pressure control switch activates a solenoid which is operable to move the outlet valve between a closed and opened position. When the pressure in the supply tank exceeds the predetermined amount, the pressure control switch activates the solenoid which then opens the outlet valve to allow the water in the housing to be evacuated from the housing. The pressure control switch cuts power to the heating element and activates the solenoid substantially simultaneously.

Lastly, the heating unit is provided with a second pressure switch which prevents activation of the heating element until the supply tank valve is opened to permit the flow of refrigerant from the supply tank to the refrigeration unit being serviced. The second pressure switch is responsive to the pressure in a hose connected to the supply tank valve. The hose in which the pressure switch is located is in fluid communication with the hose which connects the supply tank to the target unit. Thus, the pressure switch is responsive to the pressure in the supply hose. When the hose is pressurized by opening of the supply tank valve, the second pressure switch will close, to activate the heating element. This second pressure switch acts as a safety device, in that power will not flow to the heating element, and hence, the heating unit cannot be operated, without having the second pressure switch connected to the supply tank. Thus, until the supply tank is connected to the target system to pressurize the supply hose, and opened to permit the flow of refrigerant to the target system, the heating element will not be activated.

BRIEF DESCRIPTION OF THE SEVERAL VIEWS OF THE DRAWINGS

Corresponding reference numerals will be used throughout the several figures of the drawings.

DETAILED DESCRIPTION OF THE INVENTION

Figure 1:
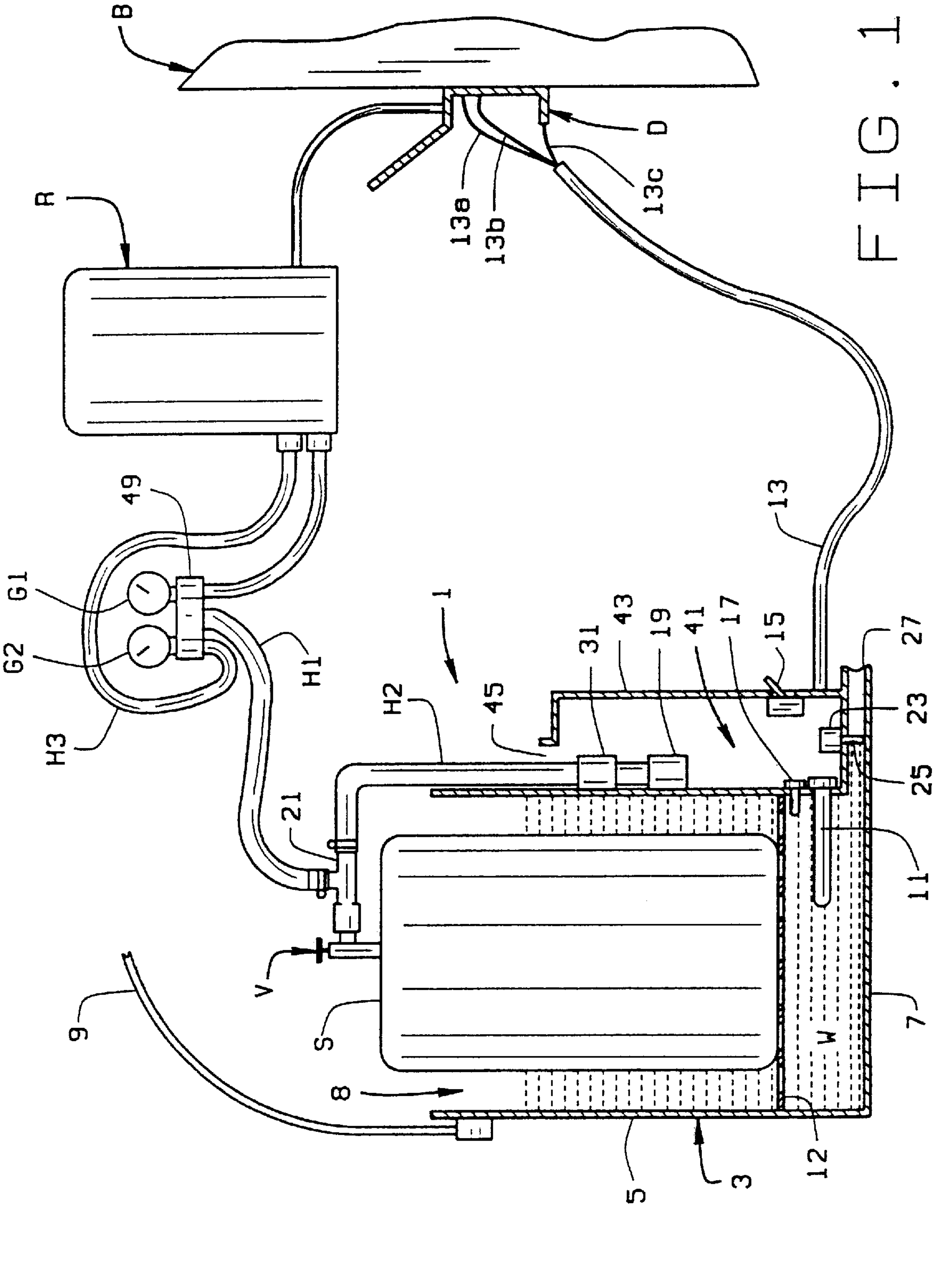
FIG. 1 is a schematic drawing of a refrigerant supply tank heating unit of the present invention connected to a source of electrical power with a refrigerant supply tank connected to a target tank, such as the refrigeration tank of an air conditioner.

The following detailed description illustrates the invention by way of example and not by way of limitation. This description will clearly enable one skilled in the art to make and use the invention, and describes several embodiments, adaptations, variations, alternatives and uses of the invention, including what I presently believe is the best mode of carrying out the invention.

A typical refrigeration unit R, such as an air conditioning unit, is located outside of a building B. The air conditioning unit may be located on the ground adjacent the building. However, frequently, the air conditioning unit is located on the building's roof. The refrigeration unit is electrically connected to the building's electrical system through a disconnect box D. To recharge the refrigeration unit with refrigerant, a refrigerant supply tank S is connected to the refrigeration unit R through a supply hose H1. Refrigerant flows through the hose H1 from the supply tank to the refrigeration unit based on the pressure differential between the supply tank S and the refrigeration unit R.

To maintain the pressure in the supply tank S greater than the pressure in the refrigeration unit R, the supply tank S is placed in a heating unit 1 of the present invention. The heating unit 1 includes an open topped housing 3 having side walls 5 and a bottom 7 which define an enclosure 8 sized to accept a standard sized refrigerant supply tank (i.e., a 30 lb. tank). A handle 9 is provided near the top of the side walls 5 to facilitate carrying of the unit 1. The handle 9 is connected at its opposite ends to the walls 5 of the housing 3. The unit 1 relies on heated water to heat the supply tank S, and thus to maintain pressure in the supply tank greater than the pressure in the refrigeration unit. Thus, the unit 1 includes a water immersable heating element 11 (such as a 2000 Watt heating element) to heat the water W in the enclosure. A grate 12 is mounted in the enclosure 8 above the heating element 11 to support the tank S above the heating element 11. The grate 12 can be a mesh grate or a plurality of bars which extend across the width of the housing 3, and which allows the water below the grate to communicate with the water above the grate, so that all the water in the enclosure 8 is heated.

Figure 2:
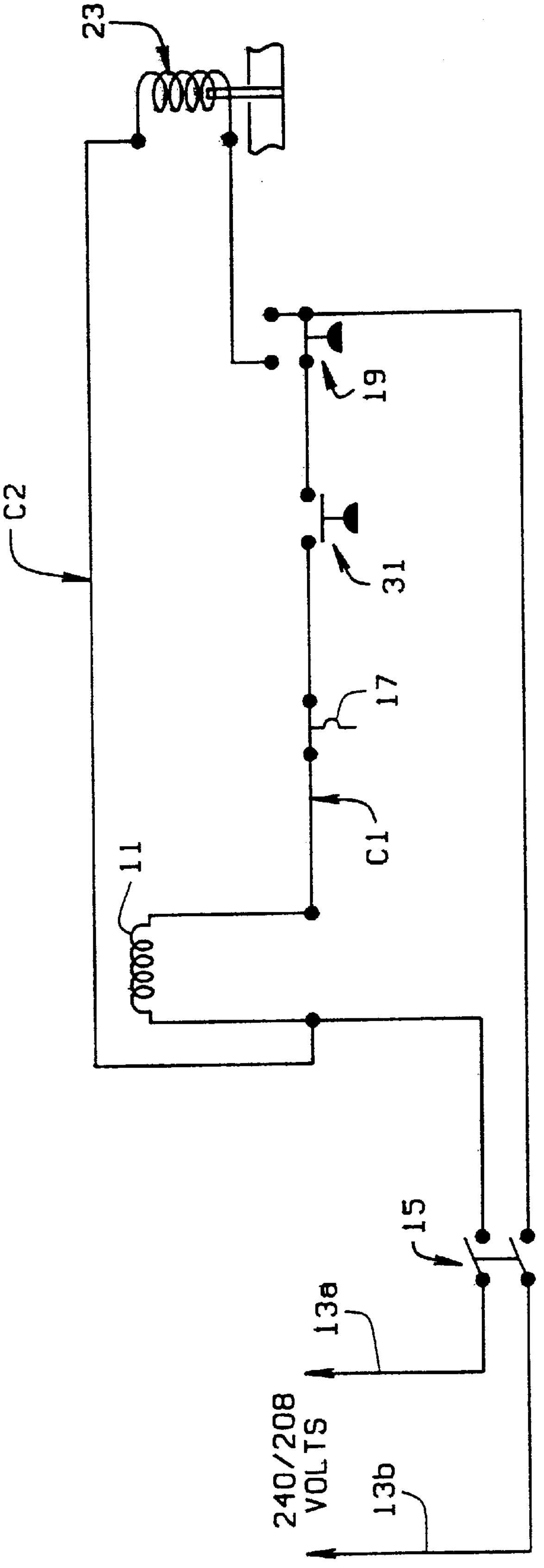
FIG. 2 is an electrical schematic of the heating unit.

The heating element is connected to a power cable 13 having three leads 13*a*, 13*b*, and 13*c*, a hot wire, a neutral wire, and a ground wire, respectively. The leads 13*a–c* each have a connector, such as an alligator clip, at their ends which allows for the wires to be connected directly to the building's 240 V electrical supply through the external disconnect box D on the building. Typically, such external disconnect boxes are located near the building's air conditioning unit. The ground wire 13*c* (which is not shown in FIG. 2) is provided to ground the unit's housing 3 to the ground of the building's electrical system. The ability to connect the unit 1 to the building's disconnect box, and hence the buildings electrical system, eliminates the need for the unit to incorporate a heavy power supply which will provide sufficient electrical energy to efficiently operate the unit 1. Further, it provides for a readily available 240 V power supply which will enable the heating element 11 to operate more efficiently. By eliminating the need for a power supply, the unit I is made lighter. Hence, it is fairly easy to transport and carry from location to location. Also, it eliminates the need for a charging system for recharging batteries which would otherwise be required to operate the unit 1.

An on/off switch 15 is provided to open and close the electrical circuit which energizes the heating element 11. Switch 15 is preferably a double pole single throw switch.

To prevent the supply tank S from becoming too hot (and to prevent the supply tank from becoming over-pressurized), the unit 1 is provided with a temperature limit switch or thermostat 17. The temperature limit switch 17 is located below the grate 12 and is connected in series with the heating element 11. The switch 17 is responsive to the temperature of the water in the enclosure 8. The temperature limit switch is normally closed. When the water temperature exceeds a desired temperature, the switch 17 will move to an open position, creating an open circuit, to turn off the flow of electrical power to the heating element 11. The temperature which will trigger the switch to cut the flow of power to the heating element depends in part upon the type of refrigerant used, how full the tank is, the tank construction, etc. The switch can be preset for a specific temperature, or can be set to a desired set point by the operator.

Although the heating element is disconnected from the power supply when the temperature limit switch 17 opens, the pressure within the supply tank S may continue to rise due to the temperature of the water. Therefore, a pressure limit switch 19 is also provided. The pressure switch 19 is a single pole double throw switch which is responsive to the pressure within the supply tank S. The switch 19 is placed in communication with the interior of the supply tank S through a hose H2. The hoses H1 and H2 are connected to the outlet valve V of the supply tank through a tee fitting 21. The pressure switch 19 is set such that the heating element electrical circuit C1 is normally closed. When the pressure in the supply tank S exceeds a predetermined value, the switch 19 is activated to open the circuit Cl to cut off power to the heating element 11. As with the temperature switch, the pressure which will trigger the switch to cut the flow of power to the heating element depends in part upon the type of refrigerant used, how full the tank is, the tank construction, etc. The switch can be preset for a specific pressure, or can be set to a desired set point by the operator.

The heating unit 1 is also provided with an outlet 27 below the grate 12 and preferably near the bottom of the enclosure 8. The outlet 27 is opened and closed by means of a waste gate or valve 25. The waste gate 25 is moved between its closed position, in which the outlet is closed to retain the water in the housing, and its opened position, in which the water can evacuated from the housing, by a solenoid 23. The solenoid 23 is activated by the pressure limit switch 19. At the same time the switch 19 opens the heating element circuit C1, it closes a circuit C2 which energizes to the solenoid 23. The waste gate 25 is normally closed to retain the water in the housing 3. When the solenoid 23 is activated, it opens the waste gate 25 to allow the hot water to exit the housing 3 through the outlet 27. Once the water is released from the enclosure 8, the supply tank will be surrounded by ambient air, which is cooler than the water. The tank S will thus begin to cool down, and the pressure within the tank will drop.

The unit 1 is additionally provided with an operational pressure switch 31 located in the hose H2 and is in series with the heating element 11. The hose H2 is in fluid communication with the supply hose Hi through the T-fitting 21. Thus, the pressure within the hose H2 is equal to the pressure in the hose H1. The switch 31 is a normally open switch, and thus the heating element will not be energized until the switch 31 is closed. The switch 31 is responsive to the pressure within the hose H2, and hence the pressure in the hose H1. It is not closed until the hose H2, and hence the hose H1, is pressurized. The hose H1 is pressurized only when it is connected between the supply tank S and the target unit, and the supply tank valve V is opened. Thus, the heating element cannot be activated, even if the on/off switch 15 is placed in its "on" position, until the supply tank S is connected to the target unit and its valve is opened to allow refrigerant to pass from the supply tank to the refrigeration unit R.

The controls for the unit 1 (i.e., the on/off switch 15, the temperature limit switch 17, and the pressure switches 19 and 31) are located within a component enclosure 41. The component enclosure 41 is defined in part by a wall 43 and by the housing wall 5. The enclosure 41 includes an opening 45 at it its top to allow the hose H2 to extend into the enclosure 41. Access to the temperature switch 17 and the heating element 11 is also provided though the enclosure 41. Preferably, the enclosure wall 43 is removably attached to the housing wall 5 so that the components (the heating element 11 and any of the switches 15, 17, 19, and 31) can be replaced or serviced when necessary.

Lastly, the supply tank S is connected to a gauge manifold 49 having has two gauges G1 and G2 to enable the technician to visually monitor the pressures of the supply tank and the target unit. Typically the manifold is supplied by the technician. The supply hose H1 passes through the manifold 49, and the gauge G1 is placed in fluid communication with the hose H1 so that the pressure of the supply tank can be visually monitored. Additionally, a third hose H3 places the second gauge G2 in communication with the refrigeration unit R, so that the pressure within the refrigeration unit can be monitored. The two gauges are positioned adjacent each other on the manifold so that the service person can visually monitor the pressure differential between the supply tank and the refrigeration unit.

Although not shown, the unit 1 can be provided with a rheostat to control the heat generated by the heating element 11. Using a rheostat, the heating element can be operated at full power to initially heat up the water W within the enclosure 8, and then the power level can be turned down. The power level can be turned up, if necessary, when the service person observes that the pressure differential between the supply tank and the refrigeration unit becomes too small. Additionally, the unit 1 can be provided with a water level switch. Such a switch would be mounted in the unit to prevent the flow of power to the heating element if the water level in the enclosure were below a certain limit, for example, below the grate 12.

In view of the above, it will be seen that the several objects and advantages of the present invention have been achieved and other advantageous results have been obtained. As various changes could be made in the above constructions without departing from the scope of the invention, it is intended that all matter contained in the above description or shown in the accompanying drawings shall be interpreted as illustrative and not in a limiting sense. For example, the unit can be provided with a further switch which will activate the solenoid 23 to open the waste gate 25, to allow the water from the unit 1 to be drained from the unit after the refrigeration unit R has been recharged. This will avoid the need to tip the unit over to empty the water from the unit. Circuit breakers or fuses could also be provided in the component enclosure 41. Such fuses or circuit breakers would be tripped in the case of an electrical short in the unit. This would prevent such an electrical short from tripping fuses or circuit breakers in the building being serviced. The gauge manifold 49 can also be used to control the heating element 1. The pressure differential between the supply tank S and the target unit R can be monitored. The heating unit can be activated, for example, only when the pressure differential between the two units falls below a desired point. Thus, as long as the pressure differential is sufficiently great, the heating unit will not be activated. Additionally, the heating element can be deactivated if the pressure differential between the two units exceeds some desired amount. These examples are merely illustrative.

I claim:

1. A heating unit for heating a refrigerant supply tank used in recharging refrigeration units, the heating unit comprising a housing having a bottom and side walls which define an enclosure sized to receive at least a portion of the supply tank; the enclosure being adapted to contain water to a level to at least partially surround the supply tank; an electrical water heating element positioned in the enclosure to heat the water, the heating element being part of an electrical circuit; and a power cord for connecting the heating unit to a source of electricity, the power cord having a free end with at least two wires extending therefrom, the wires being adapted to be connected to an exterior electrical disconnect box of a building.

2. The heating unit of claim 1 wherein the wires include connectors at their free ends, the connectors being adapted to connect the wires to an exterior electrical disconnect box of a building.

3. The heating unit of claim 1 including a temperature control switch responsive to the temperature of the water in the enclosure, the temperature control switch being operable to open the electrical circuit containing the heating element to stop the flow of power to the heating element when the temperature of the water exceeds a determined amount.

4. The heating unit of claim 1 including a pressure control switch responsive to the pressure within the supply tank, the pressure control switch being operable to open the electrical circuit containing the heating element to stop the flow of power to the heating element when the pressure in the tank exceeds a determined amount.

5. The heating unit of claim 4 including an water outlet valve positioned to be below the bottom of the supply tank when the supply tank is placed in the unit and a control for the water outlet valve; the water outlet valve being movable from a closed position in which water is retained in the enclosure and an open position in which water is evacuated from the enclosure; the control for the water outlet valve being operable to move the valve from the closed position to the open position when said pressure switch is activated.

6. The heating unit of claim 1 wherein said supply tank includes an outlet valve movable between a closed position and an open position and a supply hose adapted to connect said supply tank to a target unit, said outlet valve when opened permitting the flow of refrigerant through said supply hose; said heating unit including an operational pressure switch which is responsive to the pressure in said supply hose; said operational pressure switch being a normally opened switch, said operational pressure switch being closed upon pressurization of said supply hose.

7. The heating unit of claim 1 including a pressure hose in fluid communication with said supply hose, said operational pressure switch being in said pressure hose.

8. A heating unit for heating a refrigerant supply tank used in recharging refrigeration units, the heating unit comprising:

a housing having a bottom and side walls which define an enclosure sized to receive at least a portion of the supply tank, the enclosure being adapted to be filled with water to at least partially surround the supply tank;

an outlet port in said housing and an outlet valve in said port, said outlet valve being movable between a first closed position wherein water is retained in said enclosure and a second open position in which water can be evacuated from said enclosure a heating element in said enclosure to heat said water, said heating element being in an electrical circuit of said unit;

a solenoid adapted to move said outlet valve between said open and closed positions; and a switch responsive to the pressure in said supply tank, said switch being adapted to interrupt the flow of electricity to said heating element and to activate said solenoid to move said outlet valve to said open position when a predetermine pressure in said supply tank is reached.

9. The heating unit of claim 8 including a temperature control switch responsive to the temperature of the water in the enclosure, the temperature control switch being operable to open the first electrical circuit when the temperature of the water exceeds a determined amount.

10. The heating unit of claim 8 wherein said supply tank includes an outlet valve movable between a closed position and an open position; said heating unit including a supply hose connected to an outlet valve of said supply and adapted to be connected to a target unit and an operational pressure switch responsive to the pressure in said supply hose; said operational pressure switch being a normally opened switch, said switch being closed upon pressurization of said hose.

11. A heating unit for heating a refrigerant supply tank used in recharging refrigeration units, the heating unit comprising:

a housing having a bottom and side walls which define an enclosure sized to receive at least a portion of the supply tank;

a heating element positioned in the enclosure to heat the supply tank, the heating element being part of an electrical circuit;

a supply hose having a first end connected to an outlet of the supply tank and a second end connectable to a refrigeration unit to be charged;

an operational pressure switch responsive to the pressure within the supply hose, the operational pressure switch being movable between a first open position in which the electrical circuit is opened and a second closed position in which the electrical circuit is closed; the operational pressure switch being moved from its opened to its closed position when the supply hose is pressurized; whereby, the heating element cannot be activated unless the supply tank supply hose is connected to the refrigeration unit to be charged.

12. The heating unit of claim 11 wherein the operational pressure switch is normally in its opened position.

* * * * *